United States Patent [19]

Yamada

[11] Patent Number: 4,732,067

[45] Date of Patent: Mar. 22, 1988

[54] VENEER CLIPPER

[75] Inventor: Yoshiaki Yamada, Obu, Japan

[73] Assignee: Meinan Machinery Works, Inc., Obu, Japan

[21] Appl. No.: 11,109

[22] Filed: Feb. 5, 1987

[30] Foreign Application Priority Data

Feb. 13, 1986 [JP] Japan .................................. 61-29950

[51] Int. Cl.⁴ .......................... B23D 25/12; B26D 1/56

[52] U.S. Cl. .......................................... 83/346; 83/347; 83/348

[58] Field of Search .................. 83/346, 347, 348, 344, 83/343, 345; 72/242, 243

[56] References Cited

U.S. PATENT DOCUMENTS

| | | | |
|---|---|---|---|
| 3,808,925 | 5/1974 | Hards . | |
| 3,968,713 | 7/1976 | Mosburger | 83/347 |
| 4,095,498 | 6/1978 | Biggar, III | 83/346 |
| 4,397,204 | 8/1987 | Colombo . | |
| 4,553,461 | 11/1985 | Belongia | 83/346 |

*Primary Examiner*—E. R. Kazenske
*Assistant Examiner*—Scott A. Smith
*Attorney, Agent, or Firm*—Brooks Haidt Haffner & Delahunty

[57] ABSTRACT

A veneer clipper of rotary type is disclosed wherein a cutting knife carried by an intermittently rotatable knife carrage roll cuts through a veneer sheet moving past an anvil roll. The clipper has a plurality rotatable back-up rolls which are movable reciprocally toward and away from the carriage roll. In their operative position, the back-up rolls are pressed against the circumferential surface of the carriage roll for bracing the same to counteract the reactional pressure exerted by the anvil roll during veneer cutting. There is provided means for driving reciprocally the back-up rolls in conjunction with the intermittent rotation of the knife carriage in such a way that the back-up rolls may be kept in pressing contact with the knife carriage roll at least while the veneer sheet is being cut by the knife and then moved away from the surface after each such cut.

7 Claims, 5 Drawing Figures

VENEER CLIPPER

FIELD OF THE INVENTION

The present invention relates generally to a veneer clipper. More specifically, it relates to a clipper of the type in which a cutting knife installed in a rotatable roll member cuts through a traveling veneer sheet while being rotated with the roll member.

BACKGROUND OF THE INVENTION

Veneer clippers of various types including shear type, rotary type, etc., have been proposed heretofore to cut a sheet of wood veneer along the direction of its fiber orientation (or the direction corresponding to its lengthwise dimension transverse of the direction in which it is fed into the clipper), for eliminating defective portions such as irregularly-shaped leading and trailing edges, cracks, knot holes and other open defects and/or for cutting veneer sheet into the desired widths.

In a known veneer clipper of the rotary type, there is provided a rotatable roll carrying on its periphery and along its axis an elongated straight cutting knife which is rotated therewith intermittently at controlled timing in connection with the incoming veneer sheet advanced by conveyor into the clipper so that the veneer sheet may be cut at the desired positions.

With such rotary type veneer clipper, the knife carriage roll when rotated to its cutting position tends to bend or bow away from an anvil roll on which the veneer sheet is supported and cut, because of the cutting resistance exerted by the anvil roll against the knife. Such bowing or flexure of the carriage roll causes incomplete cuts. Though this roll flexure can be prevented by making the roll larger in diameter for providing rigidity that is great enough to resist the bowing, the resulting heavy weight will degrade the response of the knife carriage roll to intermittent rotation, thus making it difficult to excute the cutting operation at the desired high speed. Additionally, the use of a carriage roll with a larger diameter, hence with a longer circumferential distance, will inevitably lengthen the minimum veneer cutting width, which means the clipper becomes unable to eliminate a defective portion having a small dimension as measured along the direction in which the veneer sheet is advanced.

SUMMARY OF THE INVENTION

Therefore, it is an object of the invention to provide a rotary type veneer clipper having back-up means for bracing the knife carriage roll member to prevent its bowing during the cutting operation while maintaining its diameter practically as small as possible for achieving operation at a high speed and attaining a sufficiently small minimum cutting width.

The veneer clipper according to the present invention comprises an anvil roll which is disposed to extend across the direction in which the veneer sheets are advanced by a conveyor and on which each veneer sheet is supported and cut off by an elongated straight cutting knife. The knife is carried by an intermittently rotatable knife carriage roll member spaced above and parallel to the anvil roll, and extends axially of its carriage roll. The knife projects from the periphery of the carriage to such an extent that the knife in rotation may cut through a veneer sheet then fed into the clipper and moving past the cutting position on the anvil roll just beneath the knife carriage roll. The knife carriage roll member has a circumferential surface formed at least partially along its length. The clipper further includes a plurality of rotatable back-up rolls disposed above the knife carriage roll and movable reciprocally toward and away from the above circumferential surface for bracing or backing the knife carriage roll by pressing the same toward the anvil roll against the reactional pressure exerted thereby during veneer cutting. There is also provided means operable in conjunction with the intermittent rotation of the knife carriage roll for reciprocating the back-up rolls in such a way that the rolls may be kept in pressing contact with the circumferential surface of the knife carriage roll at least while the veneer sheet is being cut and then be moved away from said surface.

By thus arranging the veneer clipper, bowing of the knife carriage roll away from the anvil roll can be prevented successfully by the back-up roll which is pressed against the knife carriage roll in a direction which counteracts the reactional force produced by the anvil roll during veneer cutting. As a result, it can be assured that the knife on its carriage can perform veneer cutting with improved reliability.

Additionally, because the knife carriage roll member can be formed smaller in diameter hence with less circumferential distance, it may be constructed lightweight to make possible rapid cutting operation, and the minimum attainable cutting width of veneer can be reduced advantageously for improvement of veneer yield.

These and other objects, features and advantages of the invention will become apparent to those skilled in the art from the following description of a preferred embodiment of veneer clipper according to the present invention, which description is made with reference to the accompanying drawing, wherein:

DETAILED DESCRIPTION OF PREFERRED EMBODIMENT

Figure 1:
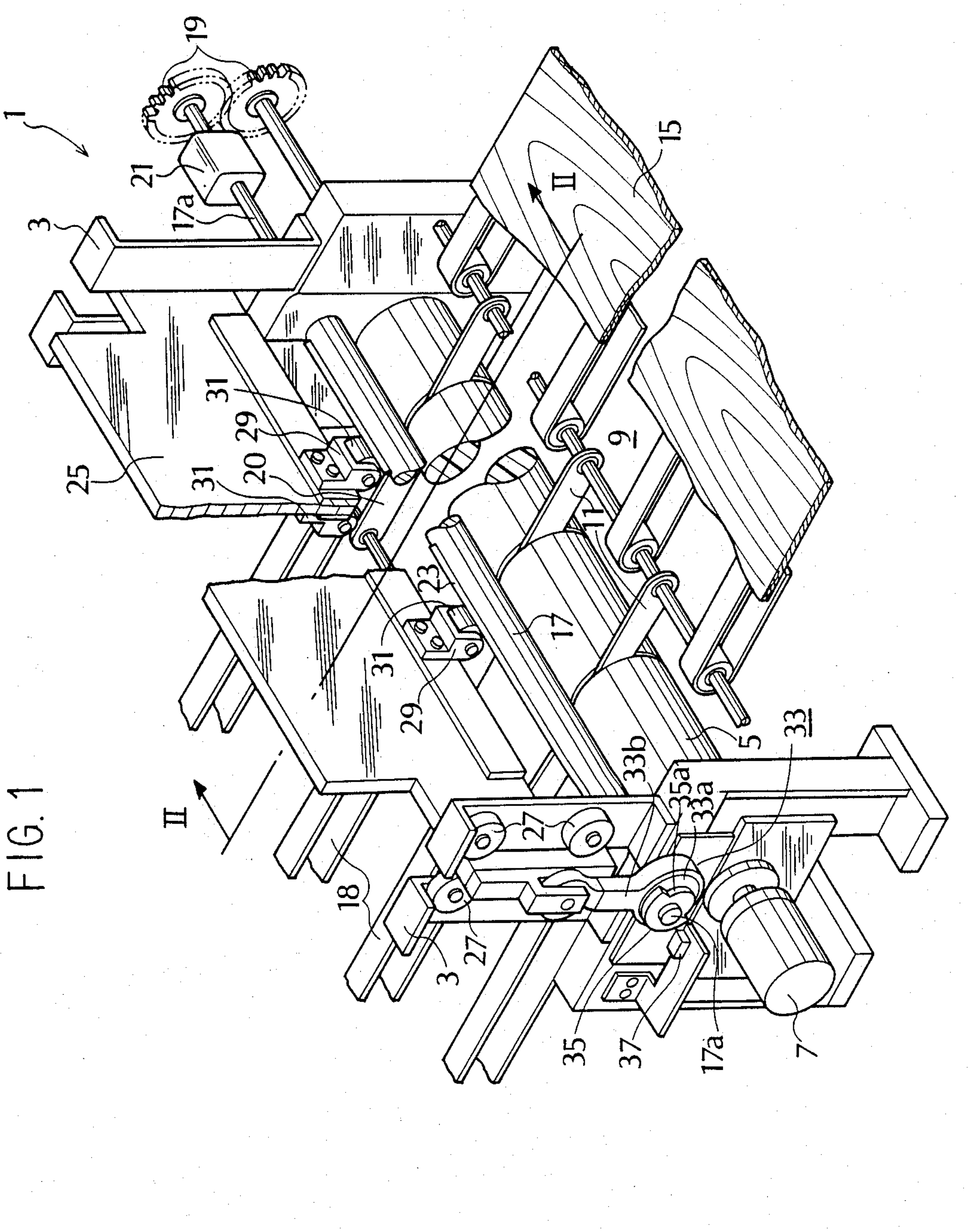
FIG. 1 is a partially cutaway, perspective view of a veneer clipper of the rotary type constructed in accordance with the present invention.
Figure 2:
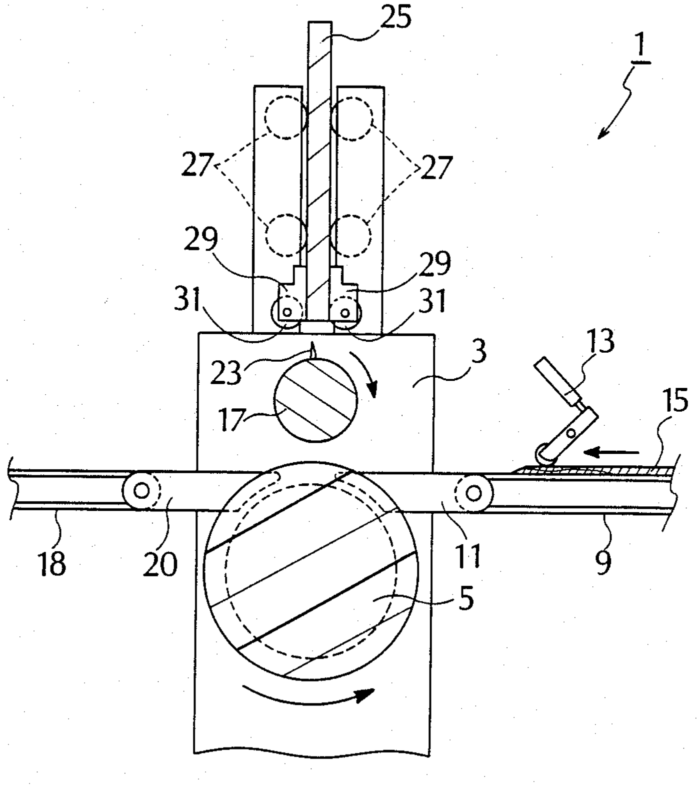
FIG. 2 is a cross-section taken along the line II—II of FIG. 1.

Referring to FIGS. 1 and 2, a veneer clipper which is generally designated by reference numeral 1 includes an anvil roll 5 which is rotatably supported by and between a pair of end frames 3 of the clipper and operatively connected to an electric motor 7 to be driven thereby continuously in arrow direction as shown in FIG. 2. This anvil roll 5 is clad with rubber or plastic material and serves as the base on which the veneer sheet is supported when it is cut through by a knife. On the infeeding side of the clipper 1 is arranged a feed conveyor 9 having a plurality of drive belts traveling at substantially the same speed as the peripheral speed of the anvil roll 5 for advancing a veneer sheet 15 toward and into the clipper. The clipper 1 and the feed conveyor 9 are connected together by way of a plurality of guide members 11 disposed so as to establish a continous and substantially flat plane extending between the top surface of the rotating anvil roll 5 and the feed conveyor 9 for guiding the movement of the incoming veneer sheet 15 into the clipper. A number of veneer detectors 13 (only one being shown in FIG. 2), e.g. photocells or limit switches, are located just above the conveyor 9, at the desired spaced intervals across the direction in which the veneer sheet is advanced into the clipper. These detectors 13 are operable to detect the presence of veneer sheet passing beneath the individual detectors and to provide an electrical signal for controlling the clipper operation in such a way that the defective irregularly shaped leading and trailing edges of each veneer sheet may be cut off and imperfections in the sheet such as holes, cracks, etc. may be eliminated by clipping. The illustrated embodiment employs limit switches as the detectors 13. For the detailed information on the function and operation of such veneer detectors, U.S. Pat. Nos. 3,477,327 and 4,510,009 may be consulted. On the delivery side of the clipper 1 is disposed a delivery conveyor 18 which is connected to the clipper via a plurality of guide members 20, which are similar to the guide members 11 associated with the feed conveyor 9, for guiding the cut sheets coming out from the clipper onto the delivery conveyor.

Figure 4:
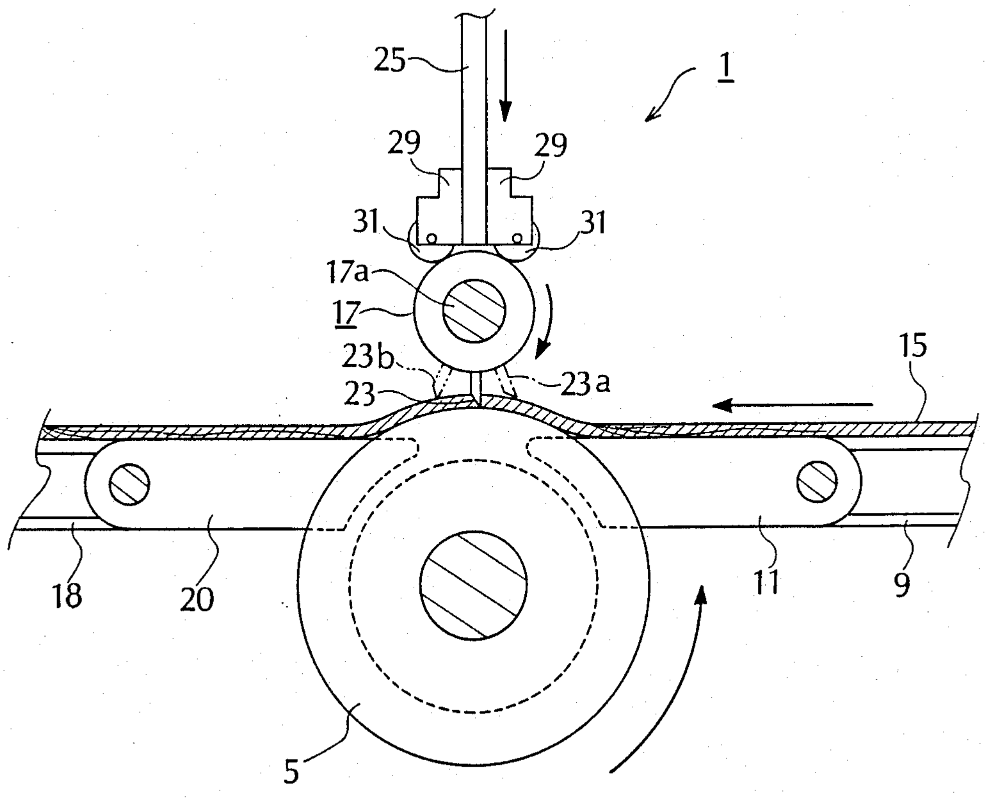
FIG. 4 is an enlarged view showing a knife carriage roll and its associated anvil roll and back-up rolls.

The veneer clipper 1 further comprises a roll 17 which is supported rotatably by and between the end frames 3 and carries an elongated straight cutting knife 23 extending along the axis thereof and projecting from the periphery thereof. This knife carriage roll 17 is disposed above the anvil roll 5 in parallel thereto at such a spaced interval that the tip of the knife 23 projecting from its carriage roll and rotating therewith may be brought into a slight engagement with the top surface of the rotating anvil roll to thereby cut through a veneer sheet then moving past the cutting position on the anvil roll just beneath the carriage roll. As seen from FIG. 1, the knife carriage roll 17 is connected to the motor 7 through the anvil roll 5, gears 19 and a clutch-brake unit 21. The unit 21 is virtually a clutch with brake and adapted to make selective connection and disconnection of power from the motor to the knife carriage roll 17 so as to effect controlled intermittent rotation of the carriage roll in accordance with the operational state of the veneer detectors 13. The carriage roll 17 is normally positioned at rest inoperatively with its knife 23 located at the top farthest from the anvil roll 5 as shown in FIG. 2. In this inoperative position of the carriage roll 17, the brake in the clutch-brake unit 21 is applied and its clutch disengaged. The carriage roll 17 is initiated when the clutch-brake unit 21 receives an electrical signal from the veneer detectors 13 and is operated thereby to release its brake and engage the clutch simultaneously. This causes the knife 23 on the carriage roll 17 to rotate a complete turn until it reaches its original uppermost inoperative position where another detector 37 is operated to cause the carriage roll to stop, the details of said detector 37 being described in detail in later part hereof. Therefore, as the knife 23 is moved to its lowermost cutting position closest to the peripheral surface of the anvil roll 5, it cuts through a veneer sheet 15 then moving past the anvil roll (FIG. 4). Thus, the veneer sheet 15 is severed by the knife 23 across the direction in which it is advanced by the conveyor 9.

Above and in parallel to the longitudinal axis of the knife carriage roll 17 is disposed a movable supporting member 25 in the form of a vertical plate extending between the end frames 3. It is reciprocally movable in vertical direction for a predetermined length of stroke while being guided by pairs of rolls 27 rotatably mounted on each end frame 3 so that the rolls of each pair may hold the plate therebetween to guide its movement. This supporting member 25 has a plurality of pairs of back-up rolls 31 rotatably supported in roll holders 29 which are fixed to the lower end of the supporting member at spaced intervals along and in parallel to the longitudinal axis of the knife carriage roll 17. As seen most clearly in FIG. 2, each pair includes rolls 31 on the upstream and downstream sides of the knife 23 with respect to the flow of veneer sheets. In the above-described structure, it is so arranged that, when the supporting member 25 is moved downwards as far as it will go, each pair of the back-up rolls 31 carried thereby is brought into pressing and rolling contact with the upper peripheral surface of the knife carriage roll 17 on both the upstream and downstream sides, as shown in FIG. 4.

In the illustrated embodiment, the supporting member 25 is driven by an eccentric drive mechanism, generally indicated by reference numeral 33, which is adapted to convert the rotary motion of the knife carriage roll 17 into vertical reciprocating movement of the supporting member 25. The eccentric drive mechanism 33 of the embodiment includes a rotatable eccentric cam member 33*a* eccentrically fixed on one axial end 17*a* of the knife carriage roll 17 adjacent to the motor 7 and an arm 33*b* having one end formed as a collar slidably mounted over the eccentric cam member and the other end linked to the supporting member 25 in such a fashion that the rotary motion of the carriage roll 17 may be converted into vertical reciprocating movement of the supporting member. The eccentric cam member 33*a* of the eccentric drive mechanism 33 is formed with such a profile and eccentricity that the supporting member 25 is driven thereby to move vertically over a distance of stroke between the top dead center position (shown in FIG. 2) which can allow the knife 23 on the carriage roll 17 to move past the back-up rolls 31 on both upstream and downstream sides without interference therewith and the bottom dead center (shown in FIG. 4) where the back-up rolls are set in rolling and pressing contact with the upper peripheral surface of the carriage roll 17 which is then rotated with its knife 23 engaged with the veneer sheet 15 passing over the anvil roll 5. In other words, the eccentric cam member 33*a* is so shaped and arranged not only to permit the back-up rolls 31 to press against the knife carriage roll 17 during cutting, but also to control the movement of the supporting member 25 in such a way that it may start moving downwards and reach its upper original position without allowing its knife 23 to interfere with the back-up rolls 31 on the upstream and downstream sides, respectively, when the knife moves past these back-up rolls.

Referring to FIG. 1, the axial end 17*a* of the carriage roll 17 adjacent to the eccentric drive mechanism 33 has a disk-shaped object 35 fixed thereto and having a circumferential cut 35*a*. This disk 35 rotates with the carriage roll 17 and operates in conjunction with a detector 37 which is located on the end frame 3 in facing relation to the circumference of the disk. The detector 37 is adapted to detect an angular position of the disk 35 corresponding to the standstill position of the carriage roll 17 with its knife 23 at the uppermost inoperative position after each complete turn thereof and to simultaneously produce an electrical signal in response to such detecting operation. The detector 37 may include any convenient device such as proximity switch, Hall element, etc. The signal emitted by the detector 37 when the knife 23 is returned to its normal standstill position disengages the clutch mechanism of the clutch-brake unit 21 to disconnect the carriage roll 17 from power and, simultaneously, applies brake to the roll to thereby stop the same.

Figure 3:
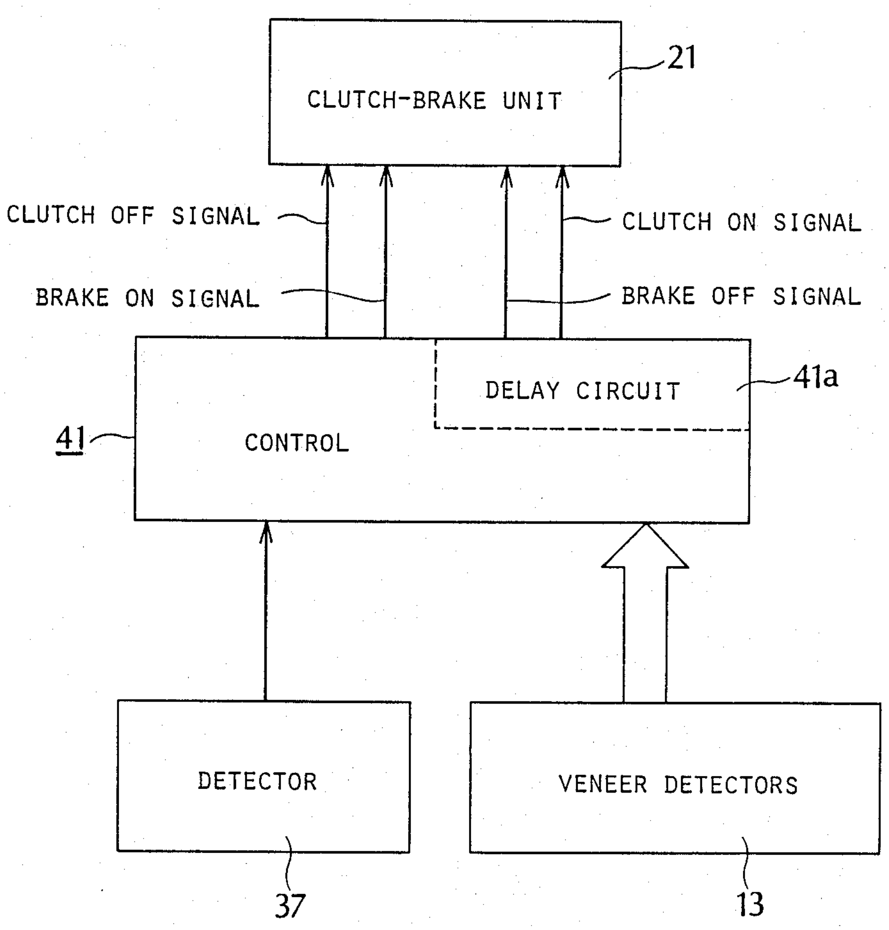
FIG. 3 is a simplified block diagram showing an electrical control system including a clutch-brake unit for controlling the clipper operation.

Now referring to FIG. 3 showing schematically an electrical control for the veneer clipper 1, a control circuit 41 is electrically connected with each veneer detector 13 to receive a "veneer detected" signal therefrom and, upon receiving such signals from all the veneer detectors, or receiving a "no-veneer detected" signal from any one of the detectors, it transmits a clutch ON and brake OFF signals to the clutch-brake unit 21 with a certain delay of time which is preset by the delay circuit 41*a* incorporated in the control 41. The length of such delay time corresponds substantially to the difference between the time for which the veneer sheet 15 is moved by the conveyor 9 from the position of the veneer detectors 13 to the cutting position on the anvil roll 5 and the time for the knife 23 to move an arc from its uppermost inoperative position to its lowermost cutting position. The above brake OFF signal causes the brake in the clutch-brake unit 21 to be released and the clutch ON signal engages the clutch, thus establishing mechanical coupling of the knife carriage roll 17 with the motor 7 through the anvil roll 5. In this way, the carriage roll 17 is rotated in arrow direction as seen in FIG. 2 synchronously with the anvil roll 5 to cut the incoming veneer sheet 15 at the desired position.

As shown in FIG. 3, the control 41 is also connected to the detector 37 which transmits an output signal thereto when it is operated to detect the specific angle of the disk 35 which is tantamount to the state where the knife 23 on the carriage roll 17 rotatable with the disk is returned to its uppermost stand-by position after each complete turn subsequent to veneer cutting by its knife 23. Simultaneously, a control signal is issued by the control 41, operating on the clutch-brake unit 21 so that its clutch is disengaged to disconnect the carriage roll 17 from the anvil roll 5 and the brake applied to stop the carriage roll at its normal inoperative position.

The operation of the veneer clipper 1 thus constructed will be described in the following with reference specifically to FIGS. 2 and 4.

The state of the veneer clipper 1 in which the knife 23 on the carriage roll 17 is placed at its uppermost inoperative position and the back-up rolls 31 are spaced apart from the carriage roll, as shown in FIG. 2; while the state thereof in which the knife 23 is turned to its lowermost cutting position and the back-up rolls 31 are brought in pressing engagement with the upper periphery of the knife carriage roll is presented in FIG. 4. Let us suppose that a veneer sheet 15, e.g. a sheet having an irregularly-shaped leading and trailing edges which need be cut straight so as to make it a usable square sheet, is being fed by the conveyor 9 toward the clipper 1. When all the veneer detectors 13 are passed by the leading edge of the sheet and hence operated by detecting the presence of veneer sheet passing therebeneath, the control 41 receives a "veneer detected" signal from the detectors and then transmits control signals to the clutch-brake unit 21 at a controlled timing with a delay of the preset length of time. As described earlier, such signals act on the clutch-brake unit 21 to release the brake of the carriage roll 17 and engage its clutch, with the result that the carriage roll 17 is coupled to the motor 7 and, therefore, driven to rotate from the uppermost standstill position of FIG. 2 in arrow direction. Simultaneously with the rotation of the carriage roll 17, the eccentric cam member 33*a* and the disk 35 are turned synchronously in the same direction. Because of the profile of the cam member 33*a* of the eccentric drive mechanism 33, the supporting member 25 can be driven thereby to move downwards allowing the knife 23 to move past the back-up rolls 31 on the upstream side without interference therewith. When the blade tip of the knife 23 is turned into contact with the advancing veneer sheet 15, as indicated by phantom line 23*a* in FIG. 4, the supporting member 25 has been lowered to its bottom dead center with its back-up rolls 31 set in pressing contact with the top peripheral surface of the carriage roll 17 so as to brace or hold down the same. As the knife 23 is rotated further to its cutting position shown by solid line, it cuts through the veneer sheet to eliminate its irregular leading edge. Though the carriage roll 17 tends to bow away from the anvil roll 5 by the cutting resistance exerted thereby during veneer cutting, such bowing can be prevented successfully by the back-up rolls 31 which are then set in rolling and pressing contact with the carriage roll.

As the knife 23 is rotated further to a position indicated by another phantom line 23*b* in FIG. 4, or where the knife is just disengaged from the veneer sheet 15 after cutting, the back-up rolls 31 on the supporting member 25 start to move away from the carriage roll 17 by the continued rotation of the eccentric cam member 33*a*. The roll 17 continues to move until the knife 23 reaches its uppermost position. To avoid the interference of the knife 23 with the back-up rolls 31 on the downstream side, the supporting member 25 is elevated to the uppermost position by the eccentric drive 33 at such timing that can permit the knife 23 to move clear of the back-up rolls on the downstream side. When the carriage roll 17 has thus rotated a complete turn to bring the knife 23 back to its inoperative position, the detector 37 is energized by the disk 35 which is then at an angular position corresponding to the above inoperative position reached by the knife 23. The control 41 receives an electrical signal from the detector 37 and in turn transmits output signals, or clutch OFF and brake ON signals, to the clutch-brake unit 21, thereby disengaging the clutch of and, simultaneously, applying the brake to the knife carriage roll 17.

When the veneer sheet 15 being advanced by the conveyor 9 causes any one of the veneer detectors 13 to be actuated because of the presence of any open defect in the sheet, such as void portion or irregularly-shaped trailing edge of the sheet, the control 41 receives an electrical signal from the detectors and causes the carriage roll clutch to be engaged with simultaneous releasing of the brake so as to initiate the carriage roll 17 and the supporting member 25 again in the same manner as in the previous cutting. As a result, the veneer sheet is severed at the position necessary for defect removal.

The above-described operations are executed repeatedly to cut veneer sheets for eliminating irregular leading and trailing edges and other open defects of successively fed veneer sheets. As would be apparent from the foregoing, the veneer clipper 1 according to the present invention is also applicable to cutting of veneer sheets into any predetermined width while eliminating the defects for producing clear veneer sheets of the desired format size, e.g. by adding any means for measuring the traveling distance of the sheet in a well-known manner.

In the above embodiment of veneer clipper according to the invention, wherein the knife carriage roll 17 is braced during the cutting operation by the back-up rolls which exert pressure to counteract the tendency of the carriage roll to bow away from the anvil roll 5, stability in the veneer cutting operation can be ensured because harmful flexure of the knife carriage roll can be prevented successfully. Because the carriage roll 17 can be thus backed up appropriately, it can be made practically with a reduced diameter so that the knife mounted thereon may describe a circular arc with a reduced distance. Such reduction of the arc reduces the minimum veneer cutting width attainable by the clipper, thus contributing to increasing the efficiency in defect removal and also to improvement in veneer yield. Furthermore, the reduced weight of the carriage roll 17 can improve its response capability in intermittent rotation and, therefore, make it possible to speed up the clipper operation.

Though, in the above-described embodiment, the supporting member 25 is driven to reciprocate by the eccentric drive mechanism 30, such movement can be achieved by use of any actuating member such as an air-operated cylinder operable from control signals issued by any appropriate detectors, such as a transducer or rotary encoder mounted on the carriage roll 17, at a controlled timing. In addition, a crank mechanism of any convenient design may be used for converting the rotary motion of the knife carriage roll into the reciprocating movement of the supporting member.

In a modified embodiment of the invention, and additional knife that is similar to the illustrated one may be mounted in the carriage roll 17 on its circumferentially opposite side. In this embodiment, the back-up rolls are disposed in such a way that they may be reciprocated in planes inclined at an angle with respect to a vertical passing through the axis of the carriage roll 17 on the upstream and downstream sides thereof, respectively, at controlled timing so as to avoid interference of the back-up rolls with the knife.

Figure 5:
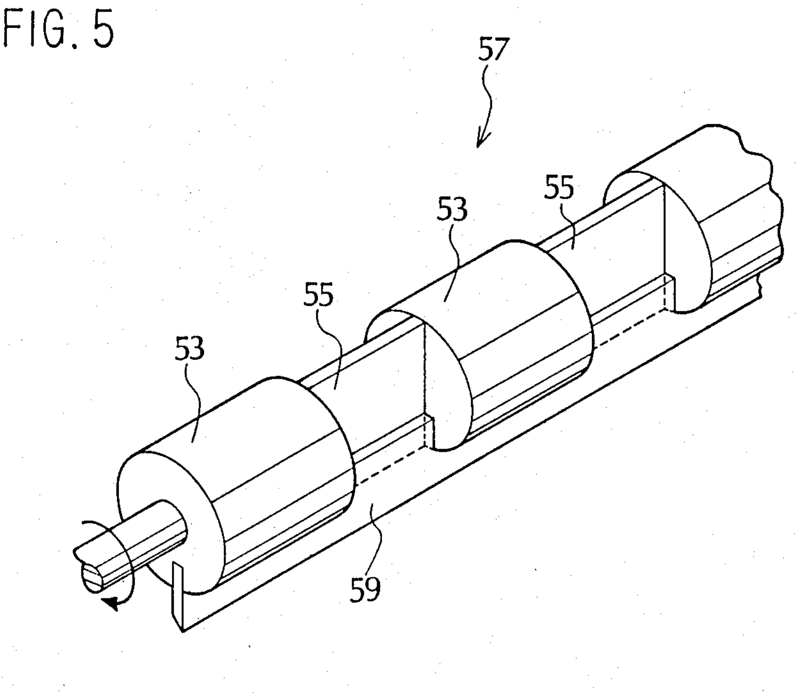
FIG. 5 is a fragmentary perspective view showing a modified form of the knife carriage roll constructed according to the invention.

FIG. 5 shows a further modified embodiment in respect of the arrangement the knife carriage roll. It comprises a rotatable body designated generally by reference numeral 57 and having a plurality of roll sections 53 each having a circumferential surface and so disposed that the back-up rolls may be brought into pressing contact with such circumferential surface, a plurality of plate members 55 each disposed between any two adjacent roll sections 53 and connecting them together securely. A cutting knife 59 is fixedly mounted in the circumferential periphery of the roll sections 53, extending parallel to the longitudinal axes of the roll sections. By so arranging the carriage roll, its mass can be reduced and therefore the rapidity in intermittent rotation can be further improved, thereby increasing the speed in veneer cutting operation of the clipper.

While the invention has been described and illustrated specifically with reference to a desired embodiment, it is to be understood that the invention can be changed or modified without departing from the spirit or scope thereof.

What is claimed is:

1. A rotary type veneer clipper for cutting a sheet of wood veneer comprising:

conveyor means for advancing veneer sheets successively into said clipper;

anvil member disposed extending transversely of the direction in which the veneer sheets are conveyed, each veneer sheet being cut on said anvil member while being supported thereby;

an intermittently rotatable knife carriage roll member spaced above and in parallel to said anvil member and carrying at least one elongated straight cutting knife extending axially of its carriage roll member and projecting from the periphery thereof to such an extent that the knife when rotated with its carriage roll member may cut through the veneer sheet then fed into the clipper and moving past the cutting position on the anvil member just beneath the knife carriage roll member;

said knife carriage roll member having a circumferential surface formed at least partially along its length;

a rotatable back-up roll disposed substantially above said knife carriage roll member and movable reciprocally toward and away from said circumferential surface for bracing the carriage roll member by pressing the same toward the anvil member;

means for reciprocating said back-up roll in conjunction with the intermittent rotation of said knife carriage roll member.

2. A rotary type veneer clipper according to claim 1, said reciprocating means includes a supporting member reciprocally movable for a predetermined length of stroke, wherein said back-up roll includes plural pairs of such back-up rolls rotatably supported by said supporting member at spaced intervals along and parallel to the longitudinal axis of said knife carriage roll member and each pair includes rolls on the upstream and downstream sides, respectively, of the knife carriage roll member with respect to the flow of veneer sheets through the clipper.

3. A rotary type veneer clipper according to claim 2, wherein said reciprocating means further include means for converting the rotary motion of said knife carriage roll member into linear reciprocating motion of said supporting member between the operative position where the back-up rolls are set in rolling and pressing contact with said circumferential surface of the knife carriage roll member and the inoperative position where said back-up rolls are retracted away from said circumferential surface.

4. A rotary type veneer clipper according to claim 3, wherein said converting means includes an eccentric drive cam member which is driven synchronously with said knife carriage roll member and so shaped that said supporting member is moved at such timing that can permit the back-up rolls to be in said operative position at least while the veneer sheet is being cut by the knife and then moved away from the operative position after each such cut.

5. A rotary type veneer clipper according to claim 4, wherein said eccentric drive cam member is so shaped that the supporting member is moved at such timing that permits the knife to move past the back-up rolls without interference therewith.

6. A rotary type veneer clipper according to claim 1, wherein said knife carriage roll member is formed by a roll having said circumferential surface throughout its entire periphery.

7. A rotary type veneer clipper according to claim 1, wherein said knife carriage includes a plurality of roll sections each having said circumferential surface and formed at such positions of the knife carriage that said pressing contact of said back-up rolls with the circumferential surfaces is obtainable, and a plurality of connecting members each disposed between any two adjacent roll sections and connecting them together.

* * * * *